United States Patent
Langley et al.

(10) Patent No.: US 12,555,123 B1
(45) Date of Patent: *Feb. 17, 2026

(54) COMPUTERIZED CONTENT DISSEMINATION

(71) Applicant: United Services Automobile Association, San Antonio, TX (US)

(72) Inventors: Guy R. Langley, San Antonio, TX (US); Jason W. Lindley, Schertz, TX (US); Donald H. Griffin, Jr., Peoria, AZ (US); Steven R. Wilson, San Antonio, TX (US); Elizabeth Garretson, Fair Oaks Ranch, TX (US); Ryan R. Barth, San Antonio, TX (US); Francisco A. Duran, San Antonio, TX (US); Ann C. Tarrillion, San Antonio, TX (US); David W. Roberts, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,099

(22) Filed: Dec. 5, 2022

Related U.S. Application Data (63) Continuation of application No. 17/520,491, filed on Nov. 5, 2021, now Pat. No. 11,521,215, which is a
(Continued)

(51) Int. Cl.
 *G06Q 30/016* (2023.01)
 *G06F 16/25* (2019.01)

(52) U.S. Cl.
 CPC ......... *G06Q 30/016* (2013.01); *G06F 16/252* (2019.01)

(58) Field of Classification Search
 None
 See application file for complete search history.

(56) References Cited

U.S. PATENT DOCUMENTS

| | | |
|---|---|---|
| 5,664,207 A | 9/1997 | Crumpler et al. |
| 6,243,859 B1 | 6/2001 | Chen-Kuang |
| | (Continued) | |

FOREIGN PATENT DOCUMENTS

| | | | | |
|---|---|---|---|---|
| WO | WO-0013122 A1 * | 3/2000 | ............. | G06Q 10/10 |
| WO | WO0118728 A2 * | 3/2001 | ............. | G06F 17/60 |
| | (Continued) | | | |

OTHER PUBLICATIONS

David Goldberg et al., "Stylus User Interfaces for Manipulative Text", Palo Alto Research Center, Xerox, Sep. 1991. (Year: 1991).
(Continued)

*Primary Examiner* — Paul R Fisher
(74) *Attorney, Agent, or Firm* — Plumsea Law Group, LLC (57) ABSTRACT

A computer method and system for disseminating computerized content via an scratchpad application in which data is received at a computing device, preferably via user input. The data is displayed on the computing device, via the scratchpad application, and a subset of the data is identified which is to be copied and disseminated. A second application is identified that will receive the data subset such that at least a portion of the data will be imported to the second application.

10 Claims, 6 Drawing Sheets

Related U.S. Application Data continuation of application No. 14/842,593, filed on Sep. 1, 2015, now Pat. No. 11,205,184.

(60) Provisional application No. 62/050,882, filed on Sep. 16, 2014.

(56) References Cited

U.S. PATENT DOCUMENTS

| | | | | |
|---|---|---|---|---|
| 6,684,183 | B1* | 1/2004 | Korall | G10L 15/193 |
| | | | | 704/E15.045 |
| 7,216,292 | B1* | 5/2007 | Snapper | G06F 40/174 |
| | | | | 715/236 |
| 7,257,581 | B1* | 8/2007 | Steele | G06Q 30/06 |
| | | | | 707/999.009 |
| 7,289,970 | B1* | 10/2007 | Siegel | G06Q 30/0226 |
| | | | | 705/14.27 |
| 7,373,603 | B1* | 5/2008 | Yalovsky | G06F 9/543 |
| | | | | 715/255 |
| 8,326,643 | B1 | 12/2012 | Eshkenazi et al. | |
| 8,964,946 | B1* | 2/2015 | Scheet | H04M 3/58 |
| | | | | 704/235 |
| 2002/0049788 | A1 | 4/2002 | Lipkin et al. | |
| 2002/0159600 | A1* | 10/2002 | Weiner | H04M 1/72436 |
| | | | | 380/270 |
| 2003/0023549 | A1 | 1/2003 | Armes et al. | |
| 2003/0212600 | A1 | 11/2003 | Hood et al. | |
| 2004/0008828 | A1* | 1/2004 | Coles | H04M 3/4936 |
| | | | | 379/88.01 |
| 2004/0030704 | A1 | 2/2004 | Stefanchik | |
| 2004/0267559 | A1* | 12/2004 | Hinderer | G06Q 30/04 |
| | | | | 705/80 |
| 2005/0288955 | A1* | 12/2005 | Lewiss-Hachmeister | |
| | | | | G06Q 40/03 |
| | | | | 705/38 |
| 2007/0173237 | A1 | 7/2007 | Roundtree | |
| 2007/0274464 | A1 | 11/2007 | Cameron et al. | |
| 2008/0005240 | A1* | 1/2008 | Knighton | H04L 12/1822 |
| | | | | 709/204 |
| 2008/0177994 | A1* | 7/2008 | Mayer | G06F 16/00 |
| | | | | 709/224 |
| 2009/0313023 | A1* | 12/2009 | Jones | G10L 13/08 |
| | | | | 704/277 |
| 2010/0106500 | A1 | 4/2010 | McKee et al. | |
| 2010/0169067 | A1 | 7/2010 | Basel et al. | |
| 2012/0035925 | A1* | 2/2012 | Friend | G06F 16/68 |
| | | | | 704/235 |
| 2012/0101975 | A1 | 4/2012 | Khosravy | |
| 2012/0150888 | A1 | 6/2012 | Hyatt et al. | |
| 2012/0173485 | A1* | 7/2012 | Kothule | G06F 16/275 |
| | | | | 707/634 |
| 2013/0318425 | A1 | 11/2013 | Mathai | |
| 2014/0032663 | A1* | 1/2014 | Ennis | H04L 67/10 |
| | | | | 709/204 |
| 2014/0188551 | A1* | 7/2014 | Westphal | G06Q 30/0201 |
| | | | | 705/7.29 |
| 2014/0372952 | A1 | 12/2014 | Otero et al. | |

FOREIGN PATENT DOCUMENTS

| | | | | |
|---|---|---|---|---|
| WO | WO 2001061590 | A2 | 8/2001 | |
| WO | WO-02063431 | A2 * | 8/2002 | G06Q 30/02 |
| WO | WO-2005057891 | A1 * | 6/2005 | H04L 65/1026 |

OTHER PUBLICATIONS

Ronnie Taib et al., "Multimodal User Interface Facilitating Critical Data Entry for Traffic Incident Management," Australian Computer Society, Inc. 3006. (Year: 2006).

* cited by examiner

COMPUTERIZED CONTENT DISSEMINATION

CROSS REFERENCE TO RELATED APPLICATIONS

This application is a Continuation of U.S. patent application Ser. No. 17/520,491 filed Nov. 5, 2021, which is a Continuation of U.S. patent application Ser. No. 14/842,593 filed Sep. 1, 2015, which claims priority to U.S. Patent Application No. 62/050,882 filed Sep. 16, 2014, which are incorporated herein by reference in their entirety.

FIELD OF THE INVENTION

The disclosed embodiments generally relate to a method and computerized system for managing computerized data, and more particularly, for disseminating content between and within applications with minimal user instructions regarding the same.

BACKGROUND OF THE INVENTION

The exponential growth of electronic data has unfortunately not been coupled with a correlated ability to integrate and effectively utilize all of the data. In particular, telephonic interactions with customers frequently require duplicative and/or unnecessary requests for information.

Accordingly, there is an unmet need to provide the ability to integrate and disseminate data between and within applications, thereby allowing a company's representative to spend less time managing computer interaction and more time managing customer interaction.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, a computer method and system for disseminating computerized content via an scratchpad application is described.

In accordance with an illustrated embodiment, data is received at a computing device, preferably via user input. The data is displayed on a computing device, via the scratchpad application, and a subset of the data is identified which is to be copied and disseminated. A second application is identified that will receive the data subset such that at least a portion of the data will be imported to the second application.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As used herein, the term "insurance" refers to a contract between an insurer, known as an insurance company, and an insured, also known as a policy holder, in which compensation is paid by the insurer to the insured for some specific losses in exchange of a certain premium amount periodically paid by the insured in past. In a typical usage, whenever the insured suffers some loss for which he/she has insured or holds policy, the insured may file an insurance claim to request compensation for the loss.

Figure 1:
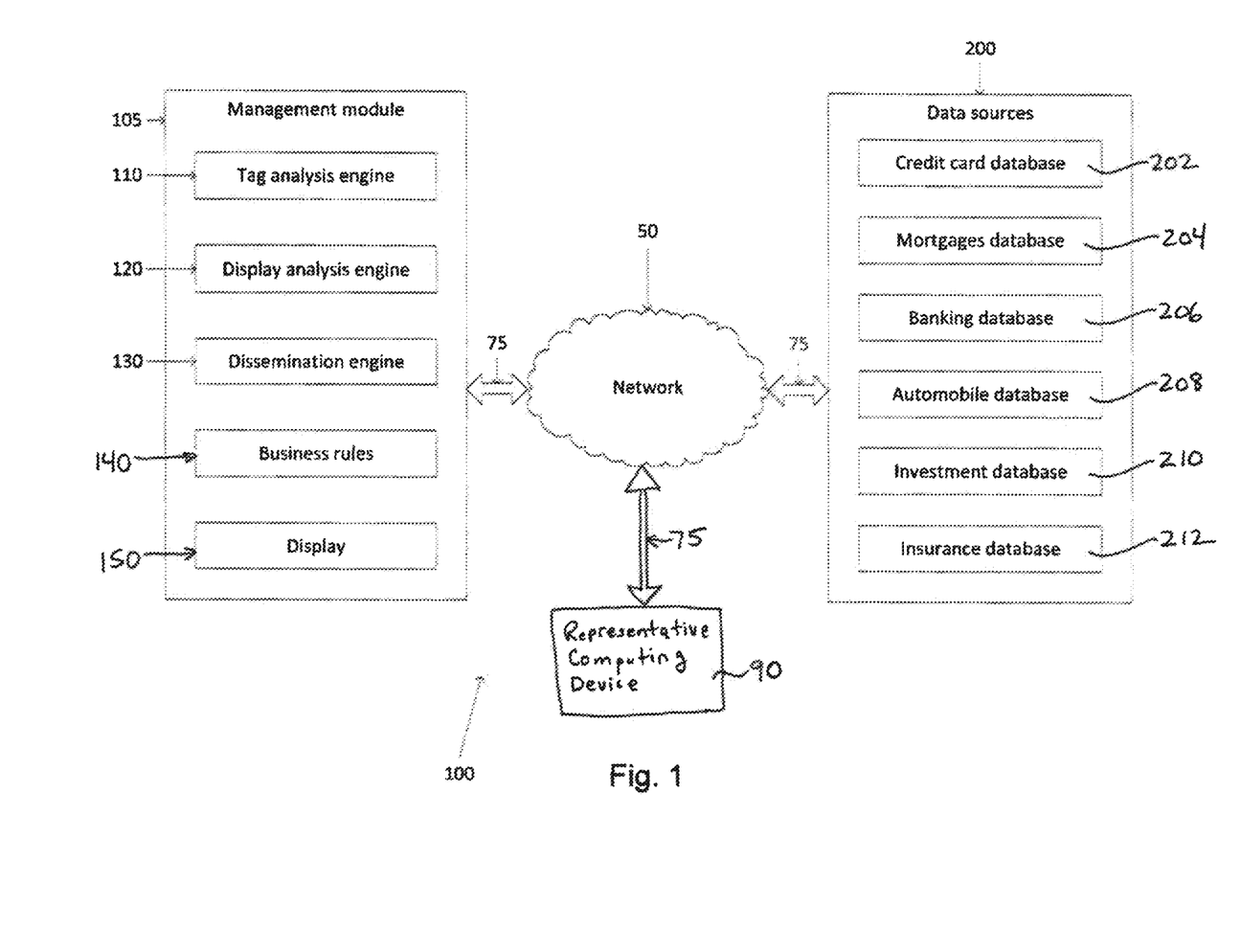
FIG. 1 illustrates an example system for disseminating computerized content within and between applications.

Turning now descriptively to the drawings, FIG. 1 depicts an exemplary system 100 that includes a representative computing device 90 that is optionally communicatively connected to data sources 200 by communication channels 75 connected to a network 50. It is to be further understood that network 50 is a geographically distributed collections of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling, structure, residence or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Communications 75 represents computerized communications as known by those skilled in the art. For instance, communications 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon. Preferably, the computer readable mediums store the computer program products in a non-transient manner.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as computing device 300) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Still referring to FIG. 1, system 100 includes management module 105 and data sources 200, which are both connected to the network 50 by communications 75. Management module 105 may include tag analysis engine 110, display analysis engine 120, dissemination engine 130, business rules 140 and/or a display 150. Exemplary data sources 200 include (and are not to be understood to be limited thereto) a credit card database 202, a mortgages database 204, a banking database 206, an automobile database 208, an investment database 210, and an insurance database 212. In one embodiment, network 50 is a LAN (best shown in FIG. 1), although it is contemplated herein that network 50 may be any system and/or method of computerized communications as understood by those skilled in the art.

Figure 2:
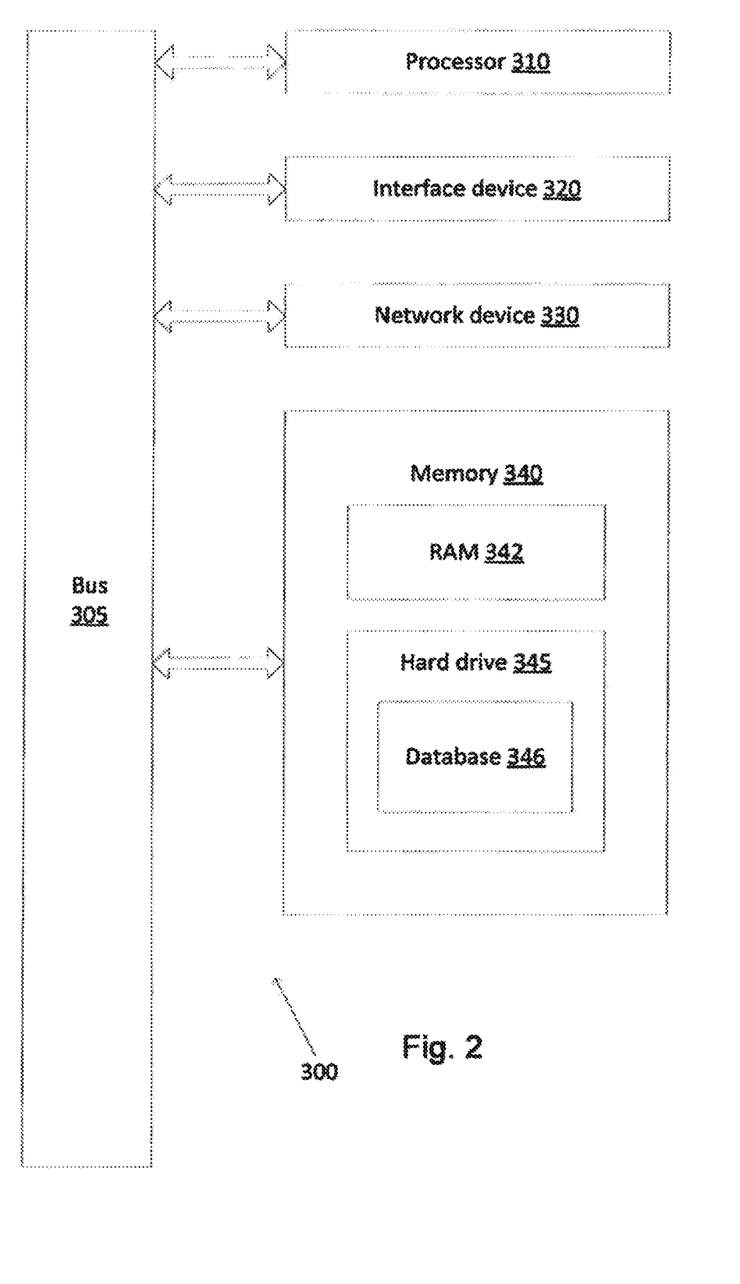
FIG. 2 illustrates a network computer device/node in accordance with an illustrated embodiment.

FIG. 2 is a schematic block diagram of an example computing device 300 that may be used (or components thereof) with one or more embodiments described herein. The example computing device 300 may serve as each of the management module 105, data source 200 and representative computing device 90. As explained above, in different embodiments these various devices may be configured to communicate with each other in any suitable way, such as, for example, via communication 75 over network 50.

Device 300 is only one example of a suitable system and is not intended to suggest any limitation as to the scope of use or functionality of embodiments of the invention described herein. Regardless, computing device 300 is capable of being implemented and/or performing any of the functionality set forth herein.

Computing device 300 is operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, tablet computing devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 300 may be described in the general context of computer system-executable instructions, such as program modules, being executed by a computer system. Generally, program modules may include routines, programs, objects, components, logic, data structures, and so on that perform particular tasks or implement particular abstract data types. Computing device 300 may be practiced in distributed data processing environments where tasks are performed by remote processing devices that are linked through a communications network. In a distributed data processing environment, program modules may be located in both local and remote computer system storage media including memory storage devices.

Device 300 is shown in FIG. 2 in the form of a general-purpose computing device. The components of device 300 may include, but are not limited to, one or more processors or processing units 310, a system memory 340, interface device 320, and a bus 305 that couples various system components including system memory 340 to processor 310.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 300 typically includes a variety of computer system readable media. Such media may be any available media that is accessible by device 300, and it includes both volatile and non-volatile media, removable and non-removable media.

System memory 340 can include computer system readable media in the form of volatile memory, such as random access memory (RAM) 342, cache memory, and hard drive 345, which may include a plurality of databases 346 relational and otherwise. Computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the invention.

It is to be appreciated (and with returning reference to FIG. 1), management module 105, has a set (at least one) of engines, such as tag analysis engine 110, display analysis engine 120, and dissemination engine 130 described below, which may be stored in memory 340, and may function solely or in combination with an operating system, one or more application programs, other program modules, and program data. Each of the operating systems, one or more application programs, other program modules, and program data or some combination thereof, may include an implementation of a networking environment. Management module 105 generally carries out the functions and/or methodologies of embodiments of the invention as described herein, although it is contemplated herein that the functionality and/or engines described as being performed on management module 105 may be performed and/or executed on any computing device that is preferably communicatively connected to management module 105.

Device 300 may also communicate with one or more interface devices 320 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces. Still yet, device 300 can communicate with one or more networks such as a local area network (LAN), a general wide area network (WAN), and/or a public network (e.g., the Internet) via a network adapter 320. As depicted, network adapter 320 communicates with the other components of computing device 300 via bus 305. It should be understood that although not shown, other hardware and/or software components could be used in conjunction with device 300. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 4:
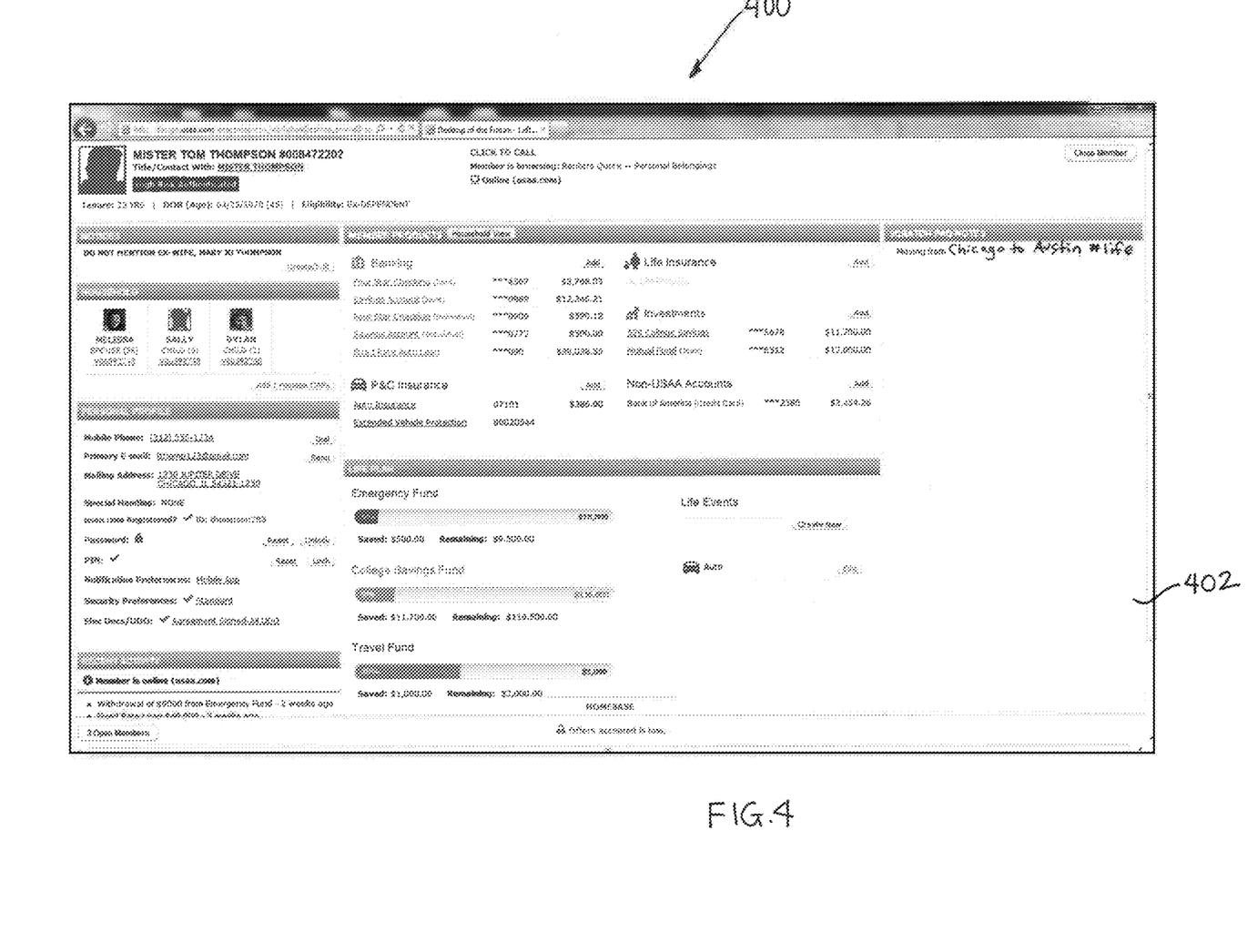
FIG. 4 is an exemplary graphical user interface or screen shot that may be used in one or more embodiments practicing the system in FIG. 1.

Referring to FIG. 4, a representative of a company that host a call center (not shown) may utilize the system 100 before, during and after interaction with a customer. During an interaction with a customer, the company service representative may be presented with a screen 400 as shown in FIG. 4. The screen 400 includes a great deal of information regarding the customer, Mr. Tom Thompson. The screen also includes a Scratch Pad Notes area 402.

Management module 105 may include, or otherwise may cooperate with, tag analysis engine 110 that identifies tags and markers within the data, particularly within the data entered in the Scratch Pad Notes area 402. For example, if the representative operating the computer entered the string "Moving from Chicago to Austin #life", tag analysis engine 110 may identify the "#" as a marker and the "life" as a tag. In another example, if the representative operating the computing device 90 enters the string "401K rollover from previous job #transfer", tag analysis engine 110 would identify "transfer" as a tag.

Management module 105 may further include display analysis engine 120 that identifies, within the data of the Scratch Pad Notes area 402 and without the aid of tags, strings to be copied. For example, if the representative entered the string "300 North Main Street, Apt. 4601, Austin, TX 78703," the display analysis engine 120 may identify that string as an address that may be copied.

Management module 105 may further include dissemination engine 130, which may receive identified strings from tag analysis engine 110 and display analysis engine 120. For example, if display analysis engine 120 identifies an address, dissemination engine 130 may import that string into the address field for the customer's contact information, and/or dissemination engine 130 may import that string into a proposed contract for services (e.g., insurance, loans, mortgages). It is contemplated herein that dissemination engine 130 may import/copy the data from one application (e.g., scratch pad, notepad) to another application (e.g., web browser that is interacting with a database that stores the customer's information, text editor that is generating a document) and/or a database (e.g., contacts database, life events database). It is further contemplated herein that the same string may be copied multiple times into a plurality of locations, and such may aid in the identification of strings to be copied.

Although the strings described herein were single-line (i.e., the strings do not have a line break or similar), it is contemplated herein that the strings of characters and/or data may be any format as would be recognized by those skilled in the art.

Figure 3:
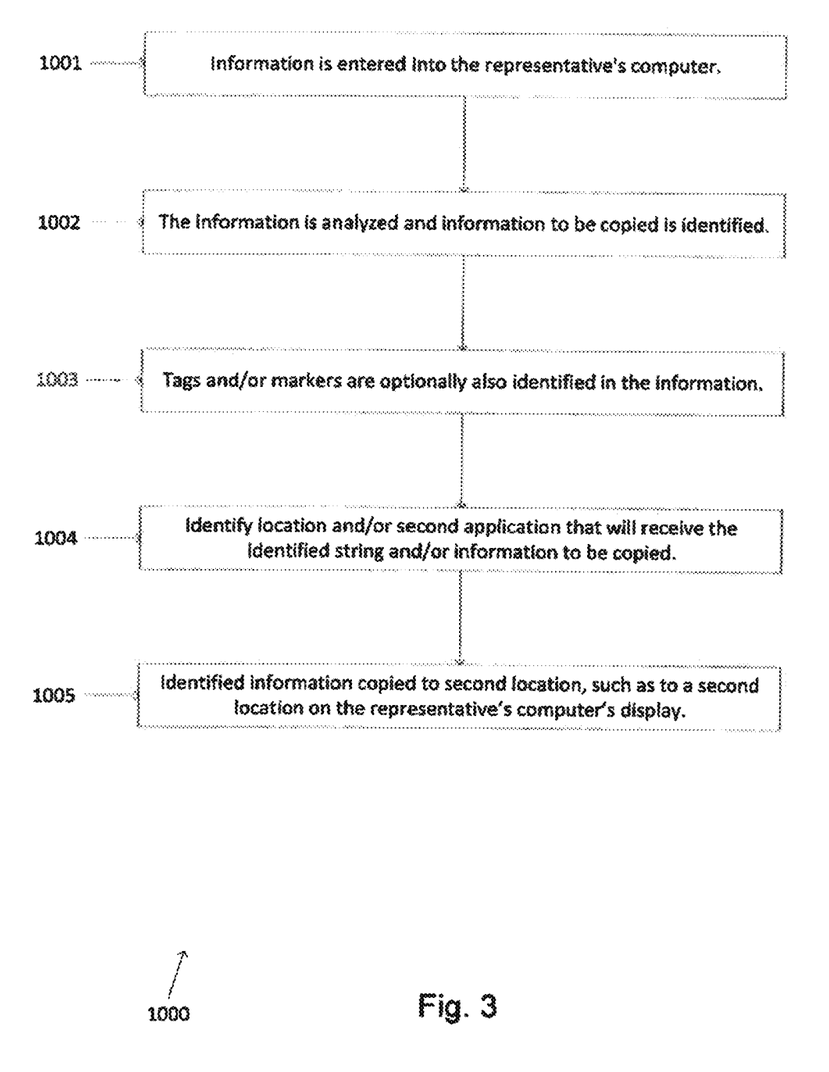
FIG. 3 is a flow diagram of operational steps of the structural informatics module of FIG. 1.

FIG. 3 shows, in the form of a flow chart (process 1000), exemplary operational steps of utilizing system 100. Before turning to descriptions of FIG. 3, it is noted that the flow diagram shown therein are described, by way of example, with reference to components shown in FIGS. 1 and 2, although these operational steps may be carried out in any system and are not limited to the scenario shown in the aforementioned figures. Additionally, the flow diagrams in FIG. 3 shows an example in which operational steps are carried out in a particular order, as indicated by the lines connecting the blocks, but the various steps shown in these diagrams can be performed in any order, or in any combination or sub-combination.

With reference to FIG. 3, starting at step 1001, information is entered into and received by the representative's computer 90. The information may be entered into the Scratch Pad Notes area 402 of FIG. 4, such as by using a text editor, or it may be entered into any application running and/or displaying on the representative's computer 90. It is contemplated herein that the information may be entered via any means as would be recognized by those skilled in the art (e.g., typing into a computer program, audio recognition of the conversation between a customer and an insurance company's representative).

Subsequently, the information is analyzed (via computing device 300) by the tag analysis engine 110 and/or the display analysis engine 120. At step 1002, the information to be copied and/or imported elsewhere is identified. Further, tags (e.g., "life", "transfer", "address", "#life", "#transfer", "#address") and/or markers (e.g., "#", "@") may be identified within information (step 1003).

At step 1004, a location to copy the string and/or subset of data is identified. It is contemplated herein that the information may be copied from one portion of an application to another portion of the same application (e.g., from one field in a web browser to another field in the same web browser), the information may be copied from one application to another application (e.g., from a scratch pad to a web browser, from a notepad to an application that interacts with a database), and/or the information may be copied from an application to a database (e.g., directly from one of the engines, indirectly via an intermediary application such as a web browser). At step 1005, the string and/or subset of data to be copied/imported is sent and/or received by the destination program and/or location.

Figure 5:
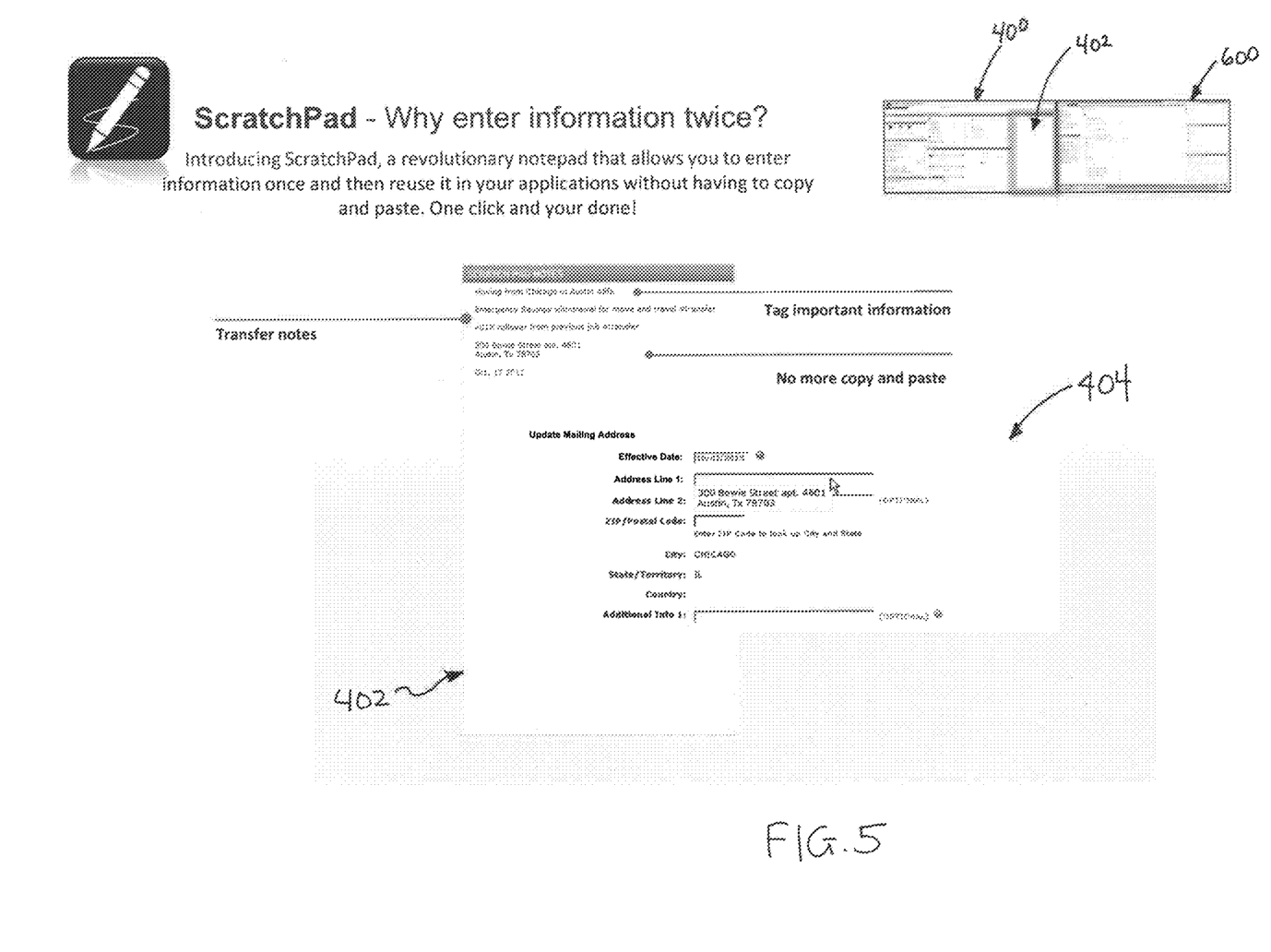
FIG. 5 is an exemplary partial screen shot that may be used in one or more embodiments practicing the system in FIG. 1.

For example, FIG. 5 illustrates the Scratch Pad Notes area 402 with entered information (step 1001). The entered information was analyzed and tagged (steps 1002, 1003). In FIG. 5, "Moving from Chicago to Austin #life" as well as "401k rollover from previous job #transfer" were tagged. The new address of Mr. Tom Thompson (e.g., 300 Bowie Street apt. 4601, Austin, TX 78703) is automatically identified as a known data type, in this instance address, and transferred into all available similar data types, in this instance an Update Mailing Address pop up 404 (step 1004). Without requiring the customer service representative to copy and paste this address information, the information is entered across applications and reused by the system 100 to allow the customer service representative to focus on the interaction with the customer (step 1005).

Figure 6:
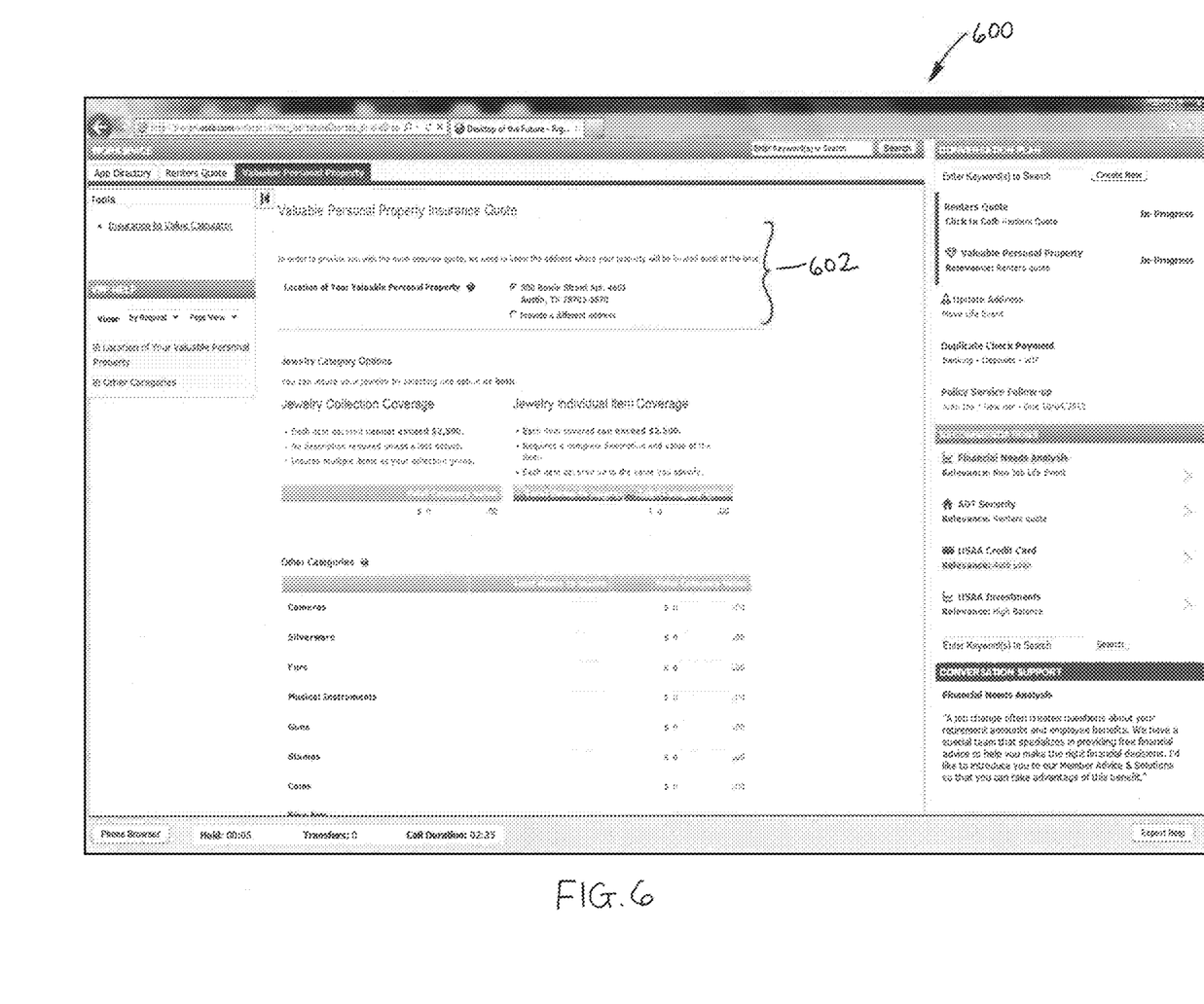
FIG. 6 is a third exemplary graphical user interface that may be used in one or more embodiments practicing the system in FIG. 1.

FIG. 6 illustrates a screen shot 600 of another application running that relates to Mr. Tom Thompson. The screen shot 600 relates to a renters insurance quote for the property of Mr. Thompson. As can be seen in the header area 602, the address for Mr. Thompson was populated into the renters insurance application from the Scratch Pad Notes area 402 with out requiring the customer service representative to copy and paste. In another embodiment, the tagged data to be reused and populated is highlighted by the customer service representative.

The engines 110, 120 also may accomplish auto tagging of data where by recognizing specific patterns and/or formats, such as an address pattern, a telephone number pattern, dollar amount pattern, an email address pattern, an account number pattern (e.g., customer number, bank account number, credit card number, etc.), a name pattern (e.g., Mr, Ms, etc.). Once identified, the system 100 automatically transfers the subset of data from one vertical application to another. If the same types of data have been input in the Scratch Pad Notes area 402, when the customer service representative gets to the appropriate field in the vertical application, the system 100 will provide a drop down selection of each piece of data. An example of this is address or phone number.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for disseminating computerized content comprising:
   providing a graphical user interface of a first application on a customer service representative computer device having a plurality of designated regions of an application interfacing with a customer service representative, wherein the plurality of regions include at least: (1) a personal profile region, (2) a members products region, (3) a life plan region, and (4) a scratchpad region;
   receiving client data in the scratchpad region on the computer device of the customer service representative entered through audio recognition of a conversation between a customer and the customer service representative during an interaction with the customer;
   identifying multiple subsets of the client data to be copied during interaction between the customer and the customer service representative, the identified multiple subsets of the client data to be copied from the scratchpad region without human intervention to at least one of the (1) personal profile region, (2) members products region, and (3) life plan region, which includes:
      determining if the client date in the scratchpad region comprises a tag wherein a subset of the multiple subsets of the client data is selected to be copied contingent on the tag; and
      recognizing patterns and formats in the client data in the scratchpad region when it is determined that no tags are present in the data to determine a subset of the multiple subsets of the client data is selected to be copied from the client data contingent upon recognized patterns and formats in the client data;
   identifying at least a second application that is running on the computer device of the customer service representative and a database that is running on a second computer device that will receive the multiple subset of the client data from the scratchpad region during interaction between the customer and the customer service representative; and
   importing the multiple subsets of the client data to each of the second application and the database without the customer service representative prompting importation of the multiple subsets during interaction between the customer and the customer service representative;
   wherein importing the subset of the data further includes (1) copying the multiple subsets of the client data from one portion of the first application to another portion of the first application, (2) copying the subset of the data directly from the first application to the second application, and (3) copying the subset of the data from the first application to the database;
   wherein the database stores the subset of the data on a hard drive, in such a manner that the subset of the data may be recalled by a third application on the computer device of the customer service representative at a future time.

2. The computer-implemented method as recited in claim 1, wherein the second application is a web browser.

3. The computer-implemented method as recited in claim 1, wherein the database is a contacts database.

4. The computer-implemented method as recited in claim 1, wherein the database is a life events database.

5. The computer-implemented method as recited in claim 1, wherein the database includes both a life events database and a contacts database.

6. A customer service representative computer device coupled to one or more client computer devices via a computer network, comprising:
   a memory configured to store instructions;
   a processor disposed in communication with said memory, wherein said processor upon execution of the instructions is configured to:
   provide a graphical user interface of a first application on the customer service representative computer device having a plurality of designated regions of an application interfacing with a customer service representative, wherein the plurality of regions include at least: (1) a personal profile region, (2) a members products region, (3) a life plan region, and (4) a scratchpad region;

receive client data in the scratchpad region on the computer device of the customer service representative entered through audio recognition of a conversation between a customer and the customer service representative during an interaction with the customer;

identify multiple subsets of the client data to be copied during interaction between the customer and the customer service representative, the identified multiple subsets of the client data to be copied from the scratchpad region without human intervention to at least one of the (1) personal profile region, (2) members products region, and (3) life plan region, which includes:

determining if the client date in the scratchpad region comprises a tag wherein a subset of the multiple subsets of the client data is selected to be copied contingent on the tag; and recognizing patterns and formats in the client data in the scratchpad region when it is determined that no tags are present in the data to determine a subset of the multiple subsets of the client data is selected to be copied from the client data contingent upon recognized patterns and formats in the client data;

identify a second application that is running on the computer device of the customer service representative and a database that is running on a second computer device that will receive the multiple subsets of the client data from the scratchpad region during interaction between the customer and the customer service representative; and import the multiple subsets of the client data to each of the second application and the database without the customer service representative prompting importation of the multiple subsets during interaction between the customer and the customer service representative;

wherein importing the subset of the data further includes (1) copying the multiple subsets of the client data from one portion of the first application to another portion of the first application; (2) copying the subset of the data directly from the first application to the second application, and (3) copying the subset of the data from the first application to the database;

wherein the database stores the subset of the data on a hard drive, in such a manner that the subset of the data may be recalled by a third application on the computer device of the customer service representative at a future time.

7. The customer service representative computer device as recited in claim 6, wherein the second application is a web browser.

8. The customer service representative computer device as recited in claim 7, wherein the database is a contacts database.

9. The customer service representative computer device as recited in claim 7, wherein the database is a life events database.

10. The customer service representative computer device as recited in claim 7, wherein the database includes both a life events database and a contacts database.

* * * * *